United States Patent
Töörn (10) Patent No.: US 7,523,136 B2
(45) Date of Patent: Apr. 21, 2009

(54) ELECTRONIC EQUIPMENT AND METHOD FOR AUTOMATIC SYNCHRONIZATION AND COMMUNICATION SYSTEM

(75) Inventor: Fredrik Töörn, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 312 days.

(21) Appl. No.: 11/325,880

(22) Filed: Jan. 5, 2006

(65) Prior Publication Data

US 2007/0143252 A1 Jun. 21, 2007

Related U.S. Application Data

(60) Provisional application No. 60/750,980, filed on Dec. 16, 2005.

(51) Int. Cl.
*G06F 17/00* (2006.01)
(52) U.S. Cl. .................. 707/104.1; 707/101; 707/102; 707/103 R; 709/230
(58) Field of Classification Search ............ 707/1–10, 707/100–104.1, 200–206; 709/230–237
See application file for complete search history.

(56) References Cited

U.S. PATENT DOCUMENTS 5,675,802 A * 10/1997 Allen et al. ................ 717/103
5,928,329 A   7/1999 Clark et al.
2004/0025072 A1* 2/2004 Mau ......................... 713/400
2004/0100496 A1* 5/2004 Creasor et al. ............. 709/216

FOREIGN PATENT DOCUMENTS

EP   1338968       8/2003
KR   1020010063284 7/2001

* cited by examiner

*Primary Examiner*—Isaac M Woo
(74) *Attorney, Agent, or Firm*—Renner, Otto, Boisselle & Sklar, LLP (57) ABSTRACT

An electronic equipment, a communication system and a method for automatic synchronization. In the communication system, at least two electronic equipments are provided. The electronic equipment can synchronies files and/or directories stored in their respective memories. Therefore, each electronic equipment may include a memory, a connecting device, a synchronizing device, a properties managing device and a remote access control. In the memory there are stored files and/or directories. Properties thereof are defined individually for the files and/or directories by said properties managing device. If any of the files and/or directories are indicated to be in "sharing mode", the connecting device searches and establishes a connection to another equipment automatically. If a corresponding file and/or directory is stored within the memory of the other electronic equipment a synchronization is performed automatically. To perform the synchronization automatically, the remote access controller controls the access to the directories and/or files.

20 Claims, 3 Drawing Sheets

ELECTRONIC EQUIPMENT AND METHOD FOR AUTOMATIC SYNCHRONIZATION AND COMMUNICATION SYSTEM

RELATED APPLICATION DATA

The present application claims the benefit of U.S. Provisional Application Ser. No. 60/750,980, filed Dec. 16, 2005, the disclosure of which is herein incorporated by reference in its entirety.

TECHNICAL FIELD OF THE INVENTION

The present invention relates to an electronic equipment, a communication system and a method for automatic synchronization. Specifically, the present invention relates to automatically synchronizing directories and/or files stored in an electronic equipment when said electronic equipment is connected to other electronic equipment.

DESCRIPTION OF RELATED ART

Today, most electronic equipment is capable of storing data of different types. It is possible, e.g., to transfer downloaded music files from a computer by using the internal memory of a mobile phone. It is also possible to update schedule data which is stored in the office computer on the basis of an e-mail program. Such a method for synchronizing data between a portable phone and a computer is shown in the abstract of Korean patent application 1020010063284 A. A connection between the mobile phone and the computer needs to be established manually. After establishing the connection between the mobile phone and the computer, a request for synchronization is sent by the mobile phone. The connected computer receives the request and transmits the relevant data to the mobile phone. The mobile phone stores this data in its internal memory.

The problem with known techniques related to the transfer of data via different electronic equipment from one device to another is that in any case the user has to establish a connection and select manually the files that are to be transmitted. In most cases it is necessary to provide a special program which is capable of communicating with one electronic equipment.

The problem with such electronic equipment and communication systems is that the transfer of data is limited to such electronic equipment which is prepared to perform the data exchange. Despite the preparation of the equipment, e.g., by installing a computer program on a computer which is to be connected to a mobile phone, it is necessary at any time a transfer of data or an update of data shall be performed to connect the electronic equipment and at least send a request manually. Thus, most of the capability of modem electronic equipment of storing data of an arbitrary type is left unused.

SUMMARY

The general problem with the state of the art electronic equipment and communication systems and method for synchronization as outlined above is that data transfer between different electronic equipments is only performed on manual input or initiation. Thus, it is up to a user to initiate a synchronization process which will often be forgotten.

Therefore, the invention provides an electronic equipment and a communication system which allows an automatic synchronization of directories and/or files with multiple other electronic equipment and to provide a method for automatic synchronization.

Synchronization may be achieved by an electronic equipment operable to connect to other electronic equipment for exchanging data and a method for automatic synchronization, as well as a communication system according to claim 14.

According to one aspect of the invention, an electronic equipment includes a memory for storing directories and/or files, a connecting device operable to establish the connection to said other electronic equipment, a properties managing device to define individual properties settings associated with said directories and/or files, a synchronizing device operable to synchronies directories and/or files with corresponding directories and/or files stored in said other electronic equipment automatically if said electronic equipment is connected to said other electronic equipment and a remote access controller operable to control access to directories and/or files of said corresponding directories and/or files.

The synchronizing device may be provided within said electronic equipment. The synchronizing device may automatically synchronize directories of said electronic equipment with directories and/or files corresponding to them. This automatic synchronization may be performed any time the electronic equipment is connected to the other electronic equipment. In order to control the access of the electronic equipment to said other electronic equipment a remote access controller may be provided which controls the access to directories and/or files, when files are read and/or written during the synchronization process in a communication system that includes at least two such electronic equipments. These at least two electronic equipments may be identical or of different types.

According to another aspect of the invention, a method for automatic synchronization of directories and/or files stored in a memory of an electronic equipment is provided. The method is for automatic synchronization of said directories and/or files with corresponding directories and/or files stored in another electronic equipment which is connectable to said electronic equipment. The method includes:

determining if at least one directory and/or file is set to a sharing mode;

connecting said electronic equipment automatically to said other electronic equipment if available and the corresponding directory and/or file is found;

determining corresponding directories and/or files stored in said connected other electronic equipment; and synchronizing said directories and/or files stored in said electronic equipment and/or synchronizing said corresponding directories and/or files stored in said connected other electronic equipment.

In one embodiment, when the method is performed it is first of all determined if at least one directory and/or file of the electronic equipment which is to be synchronized provides at least one directory and/or file which is set to a sharing mode. The sharing mode is used to indicate a directory and/or file in such a way that the synchronization process is performed for that individual directory and/or file. If at least one such directory and/or file is found in the memory of said electronic equipment said electronic equipment is connected to another electronic equipment, if such other electronic equipment is available. After such a connection is established, it is determined by the electronic equipment if corresponding directories and/or files for performing the synchronization are existing in the memory of the connected other electronic equipment. If such corresponding directories and/or files are determined, the synchronization process is started automatically.

In the context of the present application and the present invention, the term "electronic equipment" includes any kind of portable radio communication equipment. The term "portable radio communication equipment" includes all equipment such as mobile telephones, mobile phones, pagers, personal digital assistants, communicators, e.g., electronic organizers, smartphones or the like. The term "communication system" relates to any kind of communication or telecommunication system which enables the transfer of information either wireless or via cable. Although the present invention mainly deals with the receipt of information, it is to be noted that the electronic equipment and the method according to the present invention are not exclusively limited to the receipt of information, but may in a practical application enable also the transmission of information in a wireless communication system.

In one embodiment, provided is a connecting device within said electronic equipment that includes an automatic connection detector. The automatic connection detector is capable of searching other electronic equipment automatically which is connectable to said electronic equipment. The automatic connection detector may also capable of establishing such a connection if another electronic equipment connectable to said electronic equipment is found. Such a connection is established automatically only in case that property settings of at least one stored directory and/or file indicates the existence of a corresponding directory and/or file stored in said other electronic equipment. Such corresponding directory and/or file is assumed to exist in case that the property settings of at least one stored directory and/or file is set to "sharing mode". By setting the directory and/or file to said "sharing mode" it is indicated that this particular directory and/or file shall be synchronized automatically with a corresponding file and/or directory which is paired thereto.

In one embodiment, provided is a decision maker operable to determine a synchronization direction within said synchronizing device. Such a decision maker determines in which direction a synchronization shall be performed based upon the properties settings of the directories and/or files and the corresponding directories and/or files. The synchronizing direction may be one way or both ways. In case that the synchronization is performed one way only, the decision maker determines that direction by a given criterion. Such a criterion can, e.g., be given by property settings associated with a directory and/or file and its corresponding directory and/or file.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
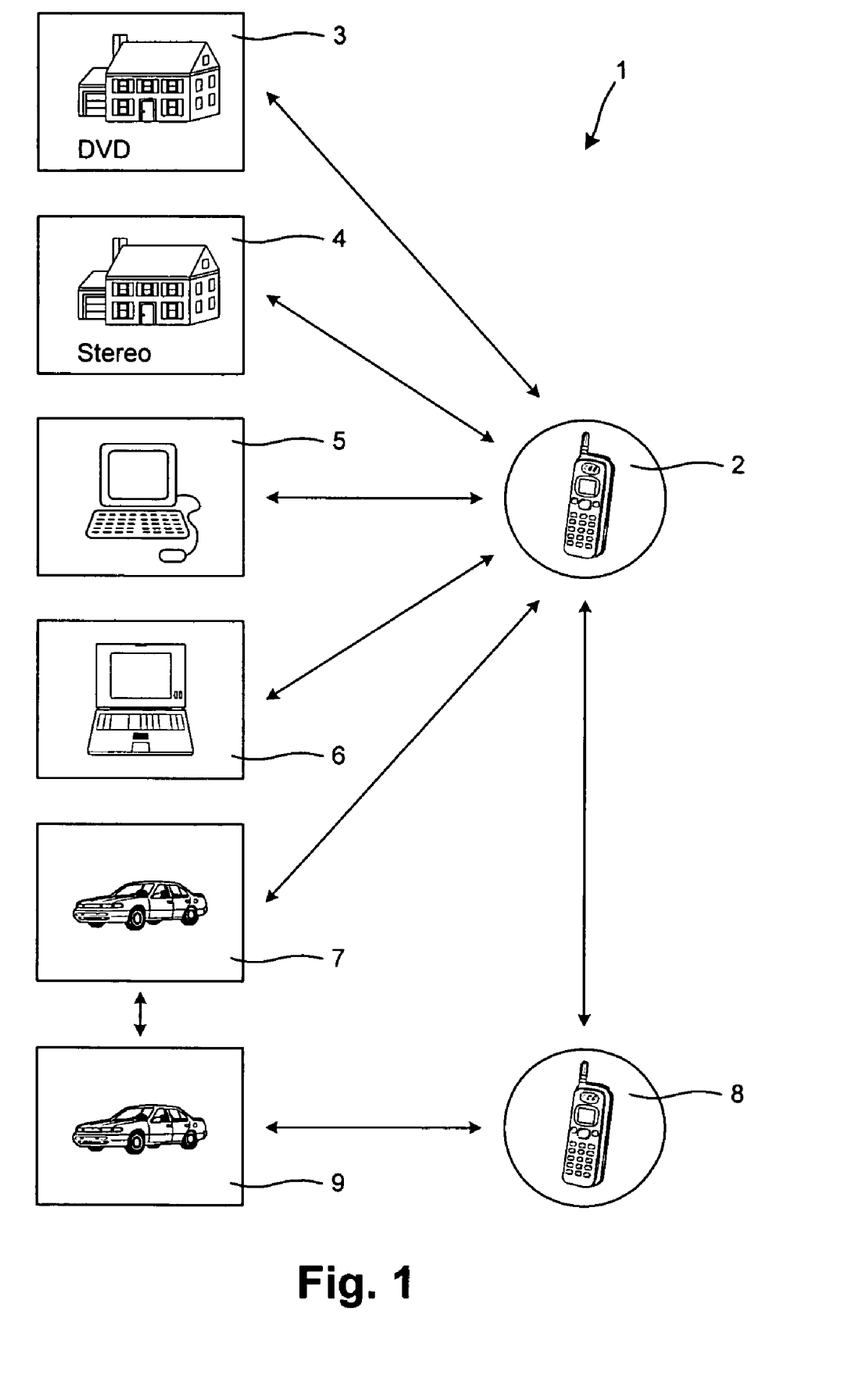
FIG. 1 illustrates an automatic synchronization in a communication system.

FIG. 1 shows a scenario representing a communication system 1 according to the present invention. The system includes a plurality of electronic equipments 2 to 9. An aspect of the functionality of each of the electronic equipments will be explained later in detail with respect to FIG. 2.

The system 1 includes multiple electronic equipments such as a first mobile phone 2, a home DVD player 3, a home stereo 4, a first computer 5, a second computer 6 and a first car 7. All the electronic equipment listed above is, e.g., owned by the same person. The system 1 can include additional electronic equipment which may be owned by a second person. The electronic equipment of the second person may be a second mobile phone 8 and a second car 9. Further equipment of the same or further persons may be included in the communication system. The electronic equipment of the system 1 can exchange data as it is indicated by the double headed arrows of FIG. 1. Each of the electronic equipments includes at least one interface device. The electronic equipments are connectable to each other via the interface device. For connecting electronic equipment with other electronic equipment it is possible to use Wireless LAN, Bluetooth, infrared (IR), GPRS or cable connections such as USB, for example. The connection can be any type of wired or wireless connection that allows transmission of a data stream. Accordingly, as used herein, the term connection includes any appropriate communication link, including networked, wireless and wired interfaces, or data exchange pathways.

The illustration of FIG. 1 shows possible connections between the first mobile phone 2 and the electronic equipments 3 to 7, but it is also possible to establish a direct connection among the electronic equipments as it is indicated by the double headed arrow connecting the first car and the second car.

If a connection is established between two electronic equipments such as the home DVD player 3 and the mobile phone 2, e.g., it is possible to exchange data between the two electronic equipments. Data in this context can be any type of file, sub-directory or directory. This means, that, e.g., a movie stored on the internal hard disk of the home DVD player 3 can be transferred via the established connection to the mobile phone 2. In that way the first mobile phone 2 can be used for transferring data stored on the home DVD player 3 to the office computer which is in the illustrated example the second computer 6. In the given example, which shows the first mobile phone 2 connectable to all of the electronic equipments 3 to 7 of the first person, a data exchange between all of the electronic equipments 3 to 7 is possible via the mobile phone 2. In one embodiment, the connection between the mobile phone 2 and the other electronic equipment is established automatically and the data exchange is performed automatically thereby synchronizing the files and/or directories stored in either equipment. Before an automatic synchronization process is initiated, the corresponding files of the other electronic equipment and the file of the first mobile phone 2 which is to be synchronized may be identified. The identification of such corresponding files or directories will be explained in detail referring to FIG. 3.

Once a file or directory or both of the mobile phone 2 and a corresponding file or directory or both of any of the electronic equipments 3 to 7 are identified to form pairs of files or directories which are to be synchronized and the first mobile phone 2 is brought into a state where a connection can be established, the connection is established automatically and the corresponding files of the other electronic equipment and the mobile phone 2 will be synchronized without further manual input. Such a connection can be established, e.g., in case the mobile phone 2 is within the reach of a wireless communication system. This means that an exchange of data stored in the memory of the first mobile phone 2 which is identified to be synchronized with a file, e.g., a music file of the home stereo 4, will be operated automatically. The synchronization process will automatically be started after the first mobile phone 2 is within the reach of the used wireless connection to the home stereo 4. For example, if a person added a new music file to already existing music files stored in the first mobile phone 2 and then reaches a distance where a Bluetooth connection to the home stereo 4 can be established this Bluetooth connection will automatically be established and afterwards added music file will be copied to the home stereo 4. The respective directory of the home stereo 4 thus is synchronized with the corresponding music directory stored in the first mobile phone 2.

Further to the equipment of a single person it is also possible to automatically synchronies equipment of other persons. Therefore, pairs of files/directories of the electronic equipment that shall perform the automatic synchronization may be identified. In FIG. 1 such a pair of directories or files or both is indicated by the double headed arrow between the first car 7 and the second car 9. This means, that, e.g., if the added music file of the first mobile phone 2 is transferred via automatic synchronization to the internal memory of an MP3 player of the first car 7, e.g., and the first car 7 and the second car 9 are parked within a distance of a possible connection between the two cars, the new music file just transferred from the first mobile phone 2 to the first car 7 is also transferred to the second car 9. In order to enable the two cars 7, 9 to establish a connection that is capable of transferring data it is possible to implement known wireless connection techniques such as Bluetooth or Wireless LAN or to use any different standard.

The pairing of two or more files or directories stored in the memories of the different electronic devices is advantageously realized by property settings associated with the individual directories or files. The individual property settings may allow, e.g., automatic synchronization between the first car 7 and the first mobile phone 2, the first car 7 and the second car 9, but not an automatic synchronization between the first car 7 and the second mobile phone 8. As indicated by the double headed arrows of FIG. 1, the second mobile phone 8 in the example is adapted to automatically synchronies with the second car 9 and the first mobile phone 2.

The present invention is especially useful for a mobile phone that is part of the communication system, because nearly everybody owns a mobile phone today. People tend to take their mobile phones with them nearly anywhere. So it is especially useful to transfer files automatically by synchronization from one other electronic equipment to further other electronic equipment which are not directly connectable. A very easy update of a document that has been stored in the memory of the home computer 5, e.g., if the respective document has been amended using the office computer 6 is performed by using the automatic synchronization via the mobile phone. The use of the mobile phone 2 for transferring, e.g., the latest version of a document between the two computers 5, 6 is performed just by leaving the office and driving home. The latest version of the document stored in the memory of the office computer 6 is synchronized with the version stored automatically in the mobile phone 2 before leaving the office. After that, the first mobile phone 2 is taken from the office and brought home where a connection to the home computer 5 is established automatically and afterwards the version of the corresponding file or directory stored in the home computer 5 is updated automatically with the version just stored in the first mobile phone 2.

As it is already apparent from the examples given with respect to the home DVD player 3 or home stereo 4 and the home computer 5 and the office computer 6, there are different ways to synchronies corresponding files or directories.

A first way is if a pair of directories has been identified as a pair of directories set to sharing mode for automatic synchronization, it is possible to only allow adding of new files to the directory. Such a setting is advantageous if the stored files themselves are not to be amended, such as music files or videos. This results in sharing new files that have been downloaded, e.g., with other equipment of the communication system 1. The settings associated with the respective directories that are identified to form a pair for synchronization therefore contain a parameter that may be stored in the properties settings, which allows determining the synchronization direction. A synchronization direction in the sense of the present invention defines which of the two electronic equipments connected to each other is updated on the basis of the directory or file of the other one. If, e.g., two directories of the home stereo 4 and a first mobile phone 2 are paired and the properties contain a setting "write only" the content of the two directories is compared and if one of the electronic equipments includes a file in the directory that is not already present in the directory of the other electronic equipment this file will be copied and thus the two directories contain similar files afterwards.

As the properties can be set individually for each directory and each file it is possible to block particular files or directories from being compared with the content of other directories. This allows preventing that selected files are shared automatically with the other electronic equipment.

The second way of synchronizing, which is useful when files to be synchronized are amendable such as document, is to set a parameter in the properties of the paired directories or files so that always the latest version of said paired documents "rules." If, e.g., the document is stored within the memory of the office computer 6 and the corresponding document is stored in the memory of the first mobile phone 2 and an amendment is made in the document of the office computer 6 this document will be copied to the memory of the first mobile phone 2. It is furthermore possible to compare if the version of the document stored in the first mobile phone 2 has been amended after the last synchronization with the corresponding document of the office computer 6. If the document stored in the memory of the first mobile phone 2 is found to be amended, the later version stored in the memory of the office computer 6 is copied to the memory of the first mobile phone 2 because of the determined synchronization direction, but the existing version of the first mobile phone 2 is not overwritten. The later version of the office computer 6 is copied additionally to the memory of the first mobile phone 2 and the already amended version of the first mobile phone 2 is kept. To distinguish the two versions from each other the original source of the document can be indicated by adding the source to the file name. For example, the original file name is amended by adding the words "created_by_device ##" or any other identifier. Such a procedure (adding and indicating a later version instead of overwriting) is also indicated by respective properties settings.

In the afore-mentioned example the document that is already stored in the memory of the first mobile phone 2 has also been amended. This version is also copied to the office computer 6 as a new file and its file name is amended by an appendix that indicates its source, too.

In addition it is possible to implement general rules for the synchronization direction. This means, that in any case, e.g., the mobile phone is the basis for synchronization. If, e.g., a parameter is set in the properties of paired directories of the car stereo of the first car 7 and the first mobile phone 2 so that the first mobile phone 2 is always the basis for synchronization, a deletion of a music file in the memory of the first mobile phone 2 will result in the deletion of the corresponding music file of the car stereo 7.

When the files that are to be synchronized are paired to each other, the property settings of these may be set individually for each pair of equipment 1 to 9. As the available memory of the first mobile phone 2, e.g., is limited, it is often not possible to just add new music files which are stored in the home stereo 4 to the memory of the first mobile phone 2. In this case it will be necessary to delete some of the music files from the memory of the mobile phone. The deletion of the music files gives part of the memory free and this part of the memory can be used for other applications. When the first mobile phone 2 is afterwards connected to the home stereo 4, the deletion of the music files stored in the home stereo 4 shall be prevented. Therefore, in case of a connection between the home stereo 4 and the first mobile phone 2 the property setting indicate that in this connection the basis for the synchronization process is always the home stereo 4 and the synchronization direction is determined accordingly. Thus, all the music files stored in the home stereo 4 are transferred to the first mobile phone 2. If the first mobile phone 2 is subsequently connected to the car stereo of the first car 7 the car stereo is overruled by the first mobile phone 2 and the files just received from the home stereo 4 are transferred to the car stereo of the first car 7 if not already stored there.

Figure 2:
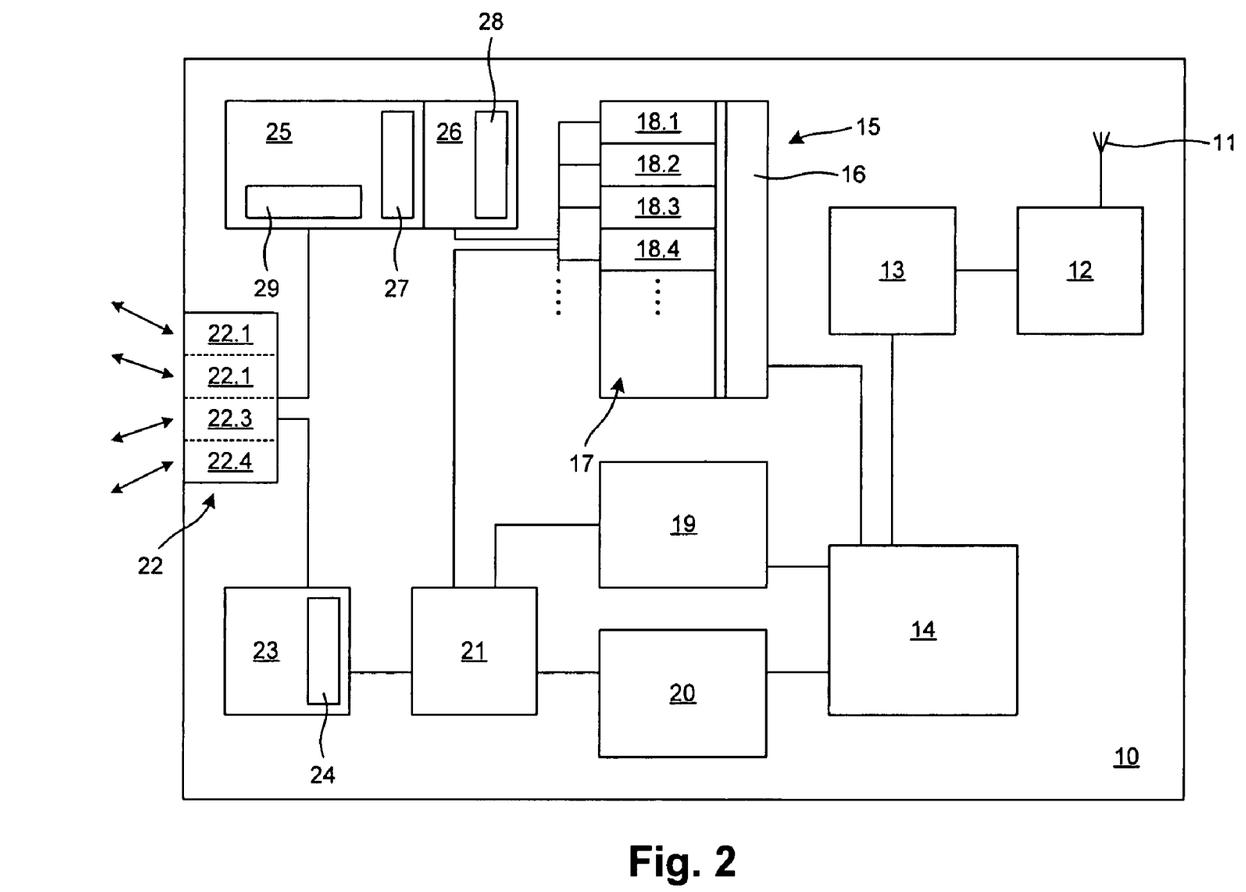
FIG. 2 shows a block diagram of an example of an electronic equipment according to the present invention.

An example for an electronic equipment according to the present invention is illustrated in FIG. 2 as block diagram. As an example for an electronic equipment according to the invention, a mobile phone 10 is used for illustration. The mobile phone 10 is chosen because of its outstanding role in the communication system according to FIG. 1.

The mobile phone 10, as an example electronic equipment according to the present invention, an antenna 11 for transmitting or receiving information in a wireless communication system, such as UMTS, GSM or any other available wireless communication system. The antenna 11 is connected to a transmitter/receiver 12 which can, e.g., be embodied as a radio frequency unit in case of said GSM or UMTS system. The processing block 13 which is connected to the transceiver/receiver 12 is for processing received signals and signals for transmission. The processing includes, e.g., (de)modulating, (de)coding and so forth of the received information signals on the wireless communication system or generating such signals for transmission.

A central control unit 14 is connected to the processing block 13 and a memory 15. The memory 15 is divided into two parts with a first part which is a reserved memory 16 used for telephone applications such as address book for example.

Further, the central control unit 14 is connected to an input device 19 and a display 20. The central control unit 14 can, e.g., be embodied in a microprocessor, central processing unit or the like. It controls the operation of the portable radio communication equipment 10.

The display 20 is, e.g., a usual phone display in case that the portable radio communication equipment is a portable phone. The display 20 is used, e.g., to display a called phone number of the telephone number of a received call. It is further visualizing user input such as numbers, characters and the like being input by the input device 19.

The information processed by the central control unit 14 is stored within the reserved memory 16. This information includes, besides the afore-mentioned address book, e.g., the software code for the operation of the portable radio communication equipment 10. The reserved memory 16 includes an information source identification memory, e.g., the phone book memory for storing information source identification information, e.g., phone number, e-mail addresses and the like, and additional information relating to the identity of the information sources, such as names, images and/or the like. The previously described devices and units of a mobile phone only describe the basic components of the phone. Further devices and units may be added in order to expand functionality of the mobile phone 10.

As it has been explained before, the memory 15 is divided into two parts. A first part is built by the reserved memory 16 for the functionality of the mobile phone 10. A second part 17 of the memory 15 can be formed by a second reserved memory which is part of the internal memory 15 of the mobile phone 10 as illustrated in FIG. 2. In an alternative embodiment, the second part of the memory 17 can also be a memory card such as SD (Secure Digital), MMC (Multi Media Card), CF (Compact Flash), SM (Smart Media) and the like.

In FIG. 2 it is illustrated that a number of directories 18.1, 18.2, 18.3 and 18.4 are stored in the second part 17 of the memory 15. The directories 18.1 to 18.4 can be part of a file structure that is established in the second part 17 of the memory 15. Within each of the directories 18.1 to 18.4 a number of sub-directories can be allocated. Within anyone of the directories 18.1 to 18.4 or sub-directories there can be stored a plurality of files. Associated with each file and/or directory 18.1 to 18.4 or sub-directories, property settings are stored. For storing the property settings, a properties manager 21 is connected to the second part 17 of the memory 15, the input device 19 and the display 20. The properties that are associated with each of the directories 18.1 to 18.4, sub-directories and/or files can be set individually by a user of the mobile phone 10. In order to set the properties in the desired way, a user inputs in the settings via the input device 19. In order to visualize already set properties, the properties manager 21 is connected to the display 20. The properties manager 21 manages all of the properties which are set with respect to any directory, sub-directory or file individually or at least the properties relevant to the pairing functionality and the automatic synchronization. This means that all of the files, sub-directories or directories 18.1 to 18.4 can be associated with different or like property settings.

In order to synchronies the directories 18.1 to 18.4, sub-directories and/or files stored in the second part 17 of the memory 15 with files, sub-directories or directories stored in memories of other electronic equipment, an interface unit 22 is provided. The interface unit 22 includes interfaces 22.1 to 22.4 for different protocols such as Bluetooth, Wireless LAN, IR, GPRS or others also including cable-bound standards such as, e.g., USB, LAN, Firewire and the like. The interfaces 22.1 to 22.4 of the interface unit 22 are controlled by a connecting device 23 which establishes a connection via one or multiple interfaces 22.1 to 22.4 of the interface unit 22. The connecting device 23 can handle more than one connection to more than one other equipment and is connected to the interface unit 22. This means, e.g., that the mobile phone 10 can be connected via Bluetooth with at least one other equipment and at the same time by an infrared connection to a further other equipment.

The connecting device 23 includes an automatic connection unit 24 which automatically starts a search for available and connectable other equipment. The search for available other equipment is performed only if at least one of the directories 18.1 to 18.4, sub-directories and/or files indicates that an automatic synchronization shall be performed. At least one of the files, sub-directories, directories 18.1 to 18.4 indicates that such an automatic synchronization shall be performed if the property settings associated with that individual directory 18.1 to 18.4, sub-directory or file identify that particular directory 18.1 to 18.4, sub-directory and/or file is in "sharing mode". Thus, the automatic connection unit 24 first sends a request to the properties manager 21 to which the connecting device 23 is connected and determines, if any of the directories 18.1 to 18.4, sub-directories and/or files is set to "sharing mode". If any of the directories 18.1 to 18.4, sub-directories and/or files is set to "sharing mode", the automatic connecting unit 24 starts the search for connectable other electronic equipment. If any other electronic equipment is found to be reachable, the respective connection is established via the connecting device 23. Other electronic equipment may be not reachable if, e.g., the maximum distance to the respective device is exceeded or the other electronic equipment is turned off.

After connecting the mobile phone 10 to any other electronic equipment the synchronization process is started. For starting the synchronization process a synchronizing device 25 is connected to the interface unit 22 and to the second part 17 of the memory 15 via a remote access control 26. Before the automatic synchronization itself takes place, the synchronizing device 25 determines the corresponding directories, sub-directories and/or files of the connected other electronic equipment. If there are any corresponding directories, sub-directories and/or files stored in the memory of a connected other electronic equipment is determined by a comparison between the individual property settings of the directories 18.1 to 18.4, sub-directories and/or files stored in the second part 17 of the memory 15 of the mobile phone 10 with the properties settings of the directories, sub-directories and/or files of the connected other electronic equipment. If a corresponding directory, sub-directory or file is found in the connected electronic equipment such a pair of directories, sub-directories and/or files can be synchronized. The identification of such a pair of directories, sub-directories and/or files is performed after the property settings of the directories, sub-directories and/or files stored in the connected electronic equipment are read in by the synchronizing device 25. The comparison of the property setting of the files, sub-directories and directories of the connected other electronic equipment is performed in a comparator 28 which is part of the remote access control 26 which handles the permission to the directories, sub-directories and/or files stored in the second part 17 of the memory 15. If the respective property settings of the directories 18.1 to 18.4, sub-directories and/or files of the second part 17 of the memory 15 of the mobile phone 10 and the property settings of the respective directories, sub-directories and/or files match this pair of directories, sub-directories and/or files can be synchronized. For the explanation such a directory, sub-directory and/or file is called corresponding directory, sub-directory and/or file when stored in the connected other electronic equipment.

In order to perform the synchronization in the correct direction, a synchronization direction may be determined. Therefore, a decision maker 29 which is part of the synchronizing device 25 decides which way the synchronization process is to be performed on the basis of the property settings of the directories 18.1 to 18.4, sub-directories and/or files of the second part 17 of the memory 15 and the corresponding directory, sub-directory and/or file. If, e.g., a file is to be added to the second part 17 of memory 15, the decision maker determines as a synchronizing direction "other equipment to mobile phone 10". Subsequent to the determination of the synchronizing direction a reader/writer 27 reads in relevant incoming data from the other equipment and writes it either to the second part 17 of the memory 15 of the mobile phone 10 or reads in from memory 15 and transmits the relevant data via the established connection to the other electronic equipment. In case, e.g., that upon determining the synchronization direction towards the mobile phone 10 a file is read in by the reader/writer 27 and stored in the second part 17 of memory 15. As it has already been described with respect to FIG. 1 writing can be performed by overwriting an existing file or directory in the memory 15 or by storing an additional file with an appendix indicating its origin. In case that the synchronization direction is determined from the mobile phone 10 as the basis to the other electronic equipment the data to be transferred is read in by the reader/writer 27 out of the second part 17 of the memory 15 and transferred via the interface unit 22 to the other electronic equipment.

Other types of electronic equipment in the system may include the components indicated by the reference numerals 17 to 29 as well. Therefore, data which is read in by the reader/writer 27 and transferred via the connection established by connecting device 23 can be read in and processed in the same way as it has been described with respect to the mobile phone 10. The communication system 1 according to the invention includes a plurality of like electronic equipments.

It is to be noted that features such as the input device 19 and the display 20 do not necessarily need to be part of the electronic equipment. It is rather possible to provide the input device 19 and display 20 in an additional apparatus which is connectable to said other electronic equipment connected to said mobile phone 10. In order to change or input property settings, this additional apparatus is connected to said other electronic equipment. For example it is possible to connect a laptop computer as additional electronic equipment to, e.g., the home stereo 4 in order to change or input property settings for the music files stored on a hard disc of said home stereo 4.

Figure 3:
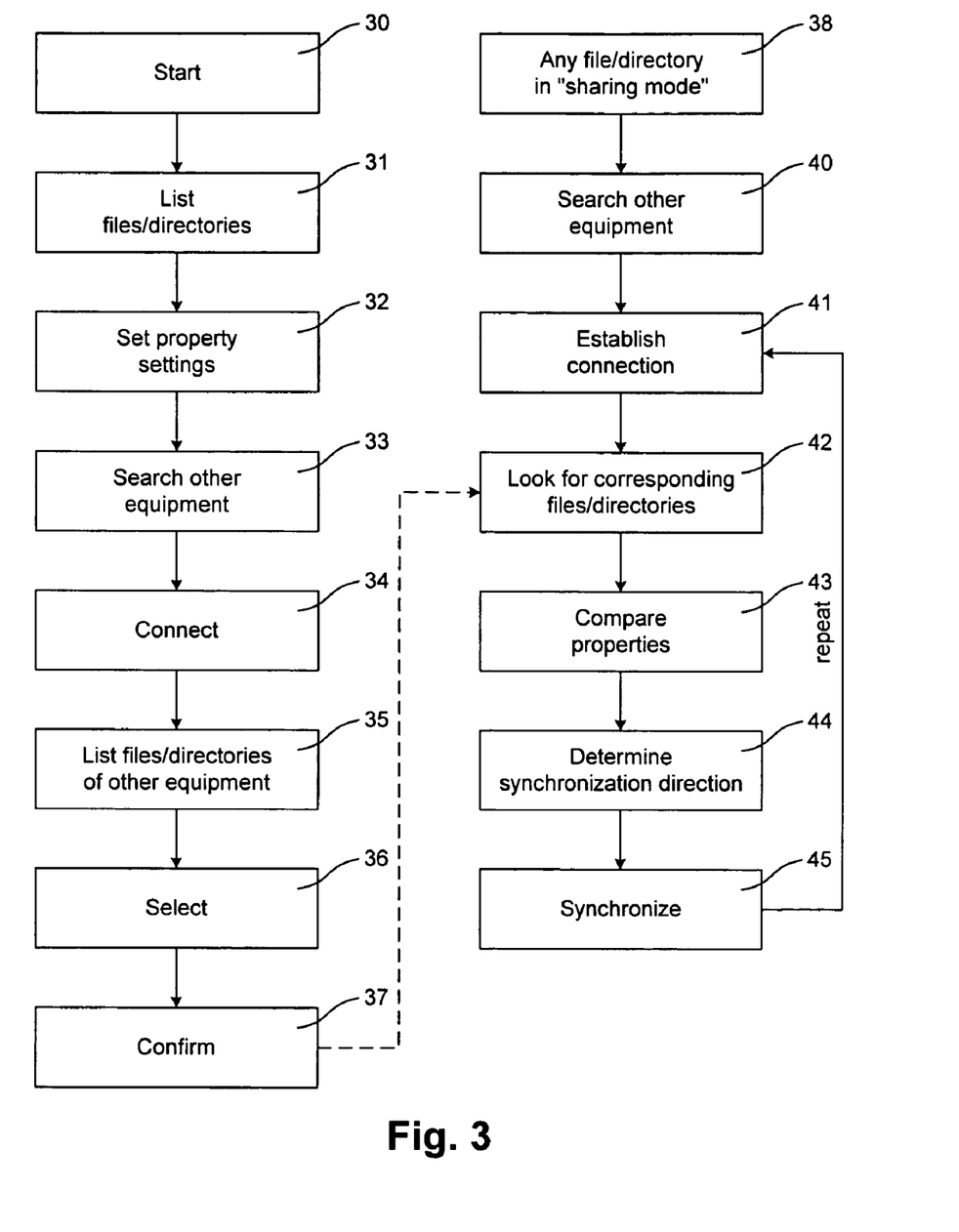
FIG. 3 shows a flow chart according to a method for automatic synchronization according to the present invention.

The steps of the automatic synchronization which have already been explained with respect to FIG. 2 are shown simplified in the flow chart of FIG. 3.

Before the automatic synchronization can be performed a pair of at least one file, sub-directory and/or directory 18.1 to 18.4 and its corresponding file, sub-directory and/or directory stored in another electronic equipment may be identified. It is to be noted, that such a pair of files and/or directories can also consist of a file and a directory or a directory and sub-directory and the like.

The initialization is started in step 30. Such an initialization may be started by pressing a button of the input device 19 or selecting a function from a menu with a pointing device such as a computer mouse. When the initialization is started, a list of the directories 18.1 to 18.4, sub-directories and files stored in the second part 17 of the memory 15 is shown on the display 20 (step 31). The property settings are set by typing in parameters, values and other input via the input device 19. With the help of the input device 19 a directory, sub-directory or file of the list shown on the display 20 is selected and the property settings for this particular directory, sub-directory and file are set to sharing mode (step 32). The input parameters, values and other input are associated with the respective file, directory or sub-directory via the property settings manager 21.

If by putting in property settings at least one of the files, sub-directories and directories is set to "sharing mode" the connecting device 23 looks for connectable other equipment (step 33) and if other electronic equipment is found to be connectable with the mobile phone 10 such a connection is established (step 34). After establishing such a connection, in step 35, a list of the files, directories and sub-directories stored in the memory of the connected other electronic equipment is shown on the display 20. The user then selects (step 36) a file, directory or sub-directory as corresponding file, directory or sub-directory. Thus the file, directory or sub-directory of the second part of the memory 17 and the corresponding one are paired and put to "sharing mode".

It is also possible to first select all the files and/or directories that are to be automatically synchronized and then start searching for connectable other equipment.

On the side of the other electronic equipment, the change of the properties settings of at least one of the files, directories and sub-directories to "sharing mode" is confirmed in step 37. The setting of a file, directory or sub-directory stored in the second part 17 of the memory 15 of the mobile phone 10 and the selection of a corresponding file, directory or sub-directory of the other electronic equipment and the confirmation thereof is repeated until all pairs of files, sub-directories or directories are identified. For each of the identified pairs of files, directories or sub-directories the synchronization process is performed automatically either immediately after the confirmation has been performed or at the end of the initialization routine. The initialization routine can be, for example, terminated by selecting the Quit-function from a menu.

A manual input for identifying a pair of a file, sub-directory or directory 18.1 to 18.4 and its corresponding file, sub-directory or directory has only to be performed once. Each time the electronic equipment, in the illustrated embodiment a mobile phone 10, is taken within the reach of, e.g., the Bluetooth connection of another electronic equipment, e.g., the home computer 5, the automatic synchronization is performed. As it has been explained with respect to FIG. 2 the connecting device 23 determines if any of the files, sub-directories or directories 18.1 to 18.4 of second part 17 of the memory 15 is set to "sharing mode"(step 38). If any of the files or directories is in the sharing mode, the connecting device 23 will search for connectable other electronic equipment automatically without user input in step 40. This search can either be done continuously or from time to time, e.g., with time intervals of 10 minutes. The time intervals can be set by a user. Longer time intervals result in longer lasting battery resources and shorter time intervals result in immediate updating of the files, directories or sub-directories.

After connectable electronic equipment has been searched a connection is established by the connecting device 23 via one of the interfaces of the interface unit 22 if any other electronic equipment is found in step 41. In step 42 it is determined if any of the files, directories or sub-directories of the connected other electronic equipment are put into the sharing mode. If at least one of the files, sub-directories or directories of the other electronic equipment is found to be in sharing mode, the properties of this corresponding directory, sub-directory and/or file are compared with the property settings of the file, sub-directory or directory stored in the second part 17 of the memory 15 (step 43). After comparing the property settings of the file, directory or sub-directory and its corresponding directories, sub-directory or file the synchronization direction is determined in step 44 by the decision maker 29. If the synchronization direction is determined the automatic synchronization is finished by reading and writing or reading and transmitting the relevant data by the reader/writer 27 in step 45. If more than one pair of files, sub-directories or directories are identified, the steps 42 to 45 are repeated until all of the identified pairs or files, sub-directories and directories are synchronized. After a synchronization has been performed automatically for all identified pairs or files, directories and sub-directories, this synchronization can be repeated also in intervals which can be set by a user.

When a connection is established, the synchronization process will be repeated automatically. The rate at which the synchronization is being repeated can be set by a user. It is furthermore possible, to implement a trigger function that sends a trigger signal any time the file, directory or sub-directory in "sharing mode" is changed or removed or in case any file, directory or sub-directory is added and put to "sharing mode".

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A portable radio communication device operable to connect to another electronic device for exchanging data, comprising:
   a memory for storing directories and/or files;
   a connecting device operable to establish a connection to the electronic device;
   a control assembly configured to:
      synchronize directories and/or files with corresponding directories and/or files stored on the electronic device when the portable radio communication device is connected to the electronic device, wherein synchronizing comprises at least one of copying missing directories and/or files, deleting additional directories and/or files, or updating changed directories and/or files of at least one of the corresponding directories and/or files as predetermined in individual properties settings;
      define the individual properties settings associated with said stored directories and/or files, wherein the individual properties settings contain pairs of files and/or directories of the portable radio communication device and the electronic device that are subject to the synchronization; and
      control access to directories and/or files by the corresponding directories and/or files;
   wherein the individual properties settings include pairing a directory in the portable radio communication device with a directory in the electronic device, and at least one of adding a file from the directory of the portable radio communication device to the paired directory of the electronic device or deleting a file from the paired directory of the electronic device.

2. The portable radio communication device according to claim 1, wherein the connecting device comprises an automatic connection detector to determine if a detected electronic device is available for connection and synchronization by establishing if the properties settings of at least one stored directory and/or file indicate existence of a corresponding directory and/or file in the detected electronic device.

3. The portable radio communication device according to claim 1, wherein the control of access to directories and/or files includes comparing properties settings of the portable radio communication device and of the connected other electronic device.

4. The portable radio communication device according to claim 1, wherein said properties settings comprise a permission indicator.

5. The portable radio communication device according to claim 1, wherein the control assembly is further configured to determine a synchronizing direction.

6. The portable radio communication device according to claim 1, wherein the control assembly is further configured to read corresponding directories and/or files of the electronic device and write said read directories and/or files to said memory of the portable radio communication device.

7. The portable radio communication device according to claim 6, wherein the control assembly is further configured to perform at least one of deleting, adding, or changing directories and/or files from said memory.

8. The portable radio communication device according to claim 1, wherein the portable radio communication device is a mobile phone.

9. A communication system comprising at least a portable radio communication device and an electronic device according to claim 1.

10. The portable radio communication device of claim 1, wherein the individual properties settings include blocking directories and/or files in the portable communication device from being compared to directories and/or files in the electronic device.

11. The portable radio communication device of claim 1, wherein the individual properties settings include synchronization rules including at least one of a) synchronization only from the portable electronic device to the electronic device, b) synchronization from the portable electronic device to the electronic device and from the electronic device to the portable electronic device, or c) at least partially blocking synchronization to the electronic device.

12. The portable radio communication device of claim 1, wherein the synchronization occurs automatically.

13. A method for synchronization of directories and/or files stored in a memory of a portable radio communication device with corresponding directories and/or files stored in another electronic device connectable to the portable radio communication device comprising the steps of:
   determining if at least one directory and/or file is set to a sharing mode;
   connecting the portable radio communication device automatically to the electronic device if the electronic device is available for connection and is determined to have a corresponding directory and/or file;
   determining corresponding directories and/or folders stored in the electronic device based on individual properties settings, which contain pairs of files and/or directories of the electronic device and the portable radio communication device that are subject to synchronization; and
   synchronizing said directories and/or files stored in the portable radio communication device with the corresponding directories and/or files stored in the electronic device, wherein synchronizing comprises at least one of copying missing directories and/or files, deleting additional directories and/or files, or updating changed directories and/or files of at least one of the corresponding directories and/or files, as predetermined in the individual properties settings;
   wherein the individual properties settings include pairing a directory in the portable radio communication device with a directory in the electronic device, and at least one of adding a file from the directory of the portable radio communication device to the paired directory of the electronic device, or deleting a file from the paired directory of the electronic device.

14. The method of claim 13, wherein the portable radio communication device searches for the electronic device automatically, when at least one directory and/or file stored in the memory of the portable radio communication device is set to sharing mode.

15. The method of claim 13, wherein properties settings of said directories and/or files and properties settings of said corresponding directories and/or files are compared.

16. The method of claim 13, wherein a comparison of properties settings of said directories and/or files stored in the portable radio communication device and of properties settings of said corresponding directories and/or files is performed and a synchronization direction is determined on the basis of the comparison.

17. The method of claim 13, wherein a synchronization direction is determined individually for each pair of directories and/or files and their corresponding directories and/or files.

18. The method of claim 13, wherein the individual properties settings include blocking directories and/or files in the portable communication device from being compared to directories and/or files in the electronic device.

19. The method of claim 13, wherein the individual properties settings include synchronization rules including at least one of a) synchronization only from the portable electronic device to the electronic device, b) synchronization from the portable electronic device to the electronic device and from the electronic device to the portable electronic device, or c) at least partially blocking synchronization to the electronic device.

20. The method of claim 13, wherein the synchronization occurs automatically.

* * * * *